(12) United States Patent
Okada et al.

(10) Patent No.: US 8,963,477 B2
(45) Date of Patent: Feb. 24, 2015

(54) SR MOTOR CONTROL APPARATUS

(75) Inventors: Hiroaki Okada, Gunma (JP); Toshiaki Isomura, Gunma (JP)

(73) Assignee: Mitsuba Corporation, Gunma (JP)

( * ) Notice: Subject to any disclaimer, the term of this patent is extended or adjusted under 35 U.S.C. 154(b) by 204 days.

(21) Appl. No.: 13/616,325

(22) Filed: Sep. 14, 2012

(65) Prior Publication Data
US 2013/0076292 A1   Mar. 28, 2013

(30) Foreign Application Priority Data
Sep. 28, 2011   (JP) .................................. 2011-211737

(51) Int. Cl.
 H02P 3/18     (2006.01)
 H02P 25/08    (2006.01)
(52) U.S. Cl.
 CPC ..................................... *H02P 25/08* (2013.01)
 USPC ........................................... 318/701; 318/800
(58) Field of Classification Search
 USPC .................. 318/700, 701, 800, 801
 See application file for complete search history.

(56) References Cited

U.S. PATENT DOCUMENTS

| | | | | |
|---|---|---|---|---|
| 4,965,710 A | * | 10/1990 | Pelly et al. | 363/56.03 |
| 5,459,385 A | * | 10/1995 | Lipo et al. | 318/701 |
| 5,504,410 A | * | 4/1996 | Davis | 318/701 |
| 5,731,970 A | * | 3/1998 | Mori et al. | 363/132 |
| 6,087,799 A | * | 7/2000 | Turner | 318/701 |
| 6,104,113 A | * | 8/2000 | Beifus | 310/68 B |
| 6,441,520 B1 | * | 8/2002 | Grant | 310/68 R |
| 6,541,838 B1 | * | 4/2003 | Suetsugu et al. | 257/500 |
| 6,888,729 B2 | * | 5/2005 | Maekawa et al. | 363/56.02 |
| 7,336,043 B2 | * | 2/2008 | Caddell | 318/135 |
| 7,977,963 B2 | * | 7/2011 | Bae et al. | 324/764.01 |

FOREIGN PATENT DOCUMENTS

JP   2007-028866 A   2/2007

* cited by examiner

*Primary Examiner* — Rina Duda
(74) *Attorney, Agent, or Firm* — Lowe Hauptman & Ham, LLP

(57) ABSTRACT

An SR motor control apparatus includes: a first half-bridge circuit connected to a neutral node of an SR motor; a second half-bridge circuit connected to a U-phase coil of the SR motor; a third half-bridge circuit connected to a V-phase coil of the SR motor; a fourth half-bridge circuit connected to a W-phase coil of the SR motor; and a switching unit including at least two power modules on which the first to fourth half-bridge circuits are mounted.

8 Claims, 8 Drawing Sheets

SR MOTOR CONTROL APPARATUS

CROSS-REFERENCE TO RELATED APPLICATION

This application is based on Japanese Patent Application No. 2011-211737 filed with the Japan Patent Office on Sep. 28, 2011, the entire content of which is hereby incorporated by reference.

BACKGROUND

1. Technical Field

The present disclosure relates to an SR motor control apparatus.

2. Related Art

An SR motor includes a U-phase coil, a V-phase coil, and a W-phase coil. These coils are connected in a star connection. This starconnecting node (the node at which terminals of the three coils are coupled) is a neutral node of the SR motor. An SR motor control apparatus supplies a control current to such an SR motor. This type of the SR motor control apparatus mainly includes a control board and a switching circuit. The control board outputs a control signal for controlling a current supplied from a power source to the SR motor. The switching circuit is connected to the positive electrode and the negative electrode of the power source. Furthermore, the switching circuit is connected to the neutral node of the SR motor, the U-phase coil, the V-phase coil, and the W-phase coil. The switching circuit supplies the control current to the coils of the SR motor in response to control signals from the control board.

The above-described SR motor control apparatus is disclosed in, for example, Japanese Patent Application Laid-Open No. 2007-28866. The switching circuit of the control apparatus disclosed in this document has four half-bridge circuits. Each of these half-bridge circuits has two power MOSFETs connected in series at the connecting node. These half-bridge circuits are arranged in parallel to each other with respect to the power source. In the half-bridge circuit, the source terminal of one FET and the drain terminal of the other FET are connected in series. The drain terminal of the one FET is connected to the positive electrode of the power source. The source terminal of the other FET is connected to the negative electrode of the power source.

The neutral node of the SR motor is connected to the connecting node of one of the four half-bridge circuits, or a first half-bridge circuit. Also, the U-phase coil, the V-phase coil, and the W-phase coil are connected to the connecting nodes of the rest three half-bridge circuits, respectively.

Here, when the SR motor operates, two FETs of the first half-bridge circuit are switched such that either one of them is almost always in a turned-on state. Therefore, a current almost always flows in either one of these FETs, except for a dead time period in the switching operation.

On the other hand, in six FETs of the rest of three half-bridge circuits, the FETs are sequentially switched one by one based on Pulse Width Modulation (PWM) signals. Therefore, the current sequentially and intermittently flows in these half-bridge circuits.

That is, the time period of the turned-on state in the FET of the first half-bridge circuit is longer than that in the FET of the rest of three half-bridge circuits. Thus, the time period when the current flows in the FET of the first half-bridge circuit is relatively long.

SUMMARY

An SR motor control apparatus includes: a first half-bridge circuit having an element array including two semiconductor switching elements connected in series at a connecting node, both ends of the element array being connected to a power source, and a neutral node of an SR motor being connected to the connecting node; a second half-bridge circuit having an element array including two semiconductor switching elements connected in series at a connecting node, both ends of the element array being connected to the power source, and a U-phase coil of the SR motor being connected to the connecting node; a third half-bridge circuit having an element array including two semiconductor switching elements connected in series at a connecting node, both ends of the element array being connected to the power source, and a V-phase coil of the SR motor being connected to the connecting node; a fourth half-bridge circuit having an element array including two semiconductor switching elements connected in series at a connecting node, both ends of the element array being connected to the power source, and a W-phase coil of the SR motor being connected to the connecting node; and a switching unit including at least two power modules on which the first to fourth half-bridge circuits are mounted.

DETAILED DESCRIPTION

Figure 1:
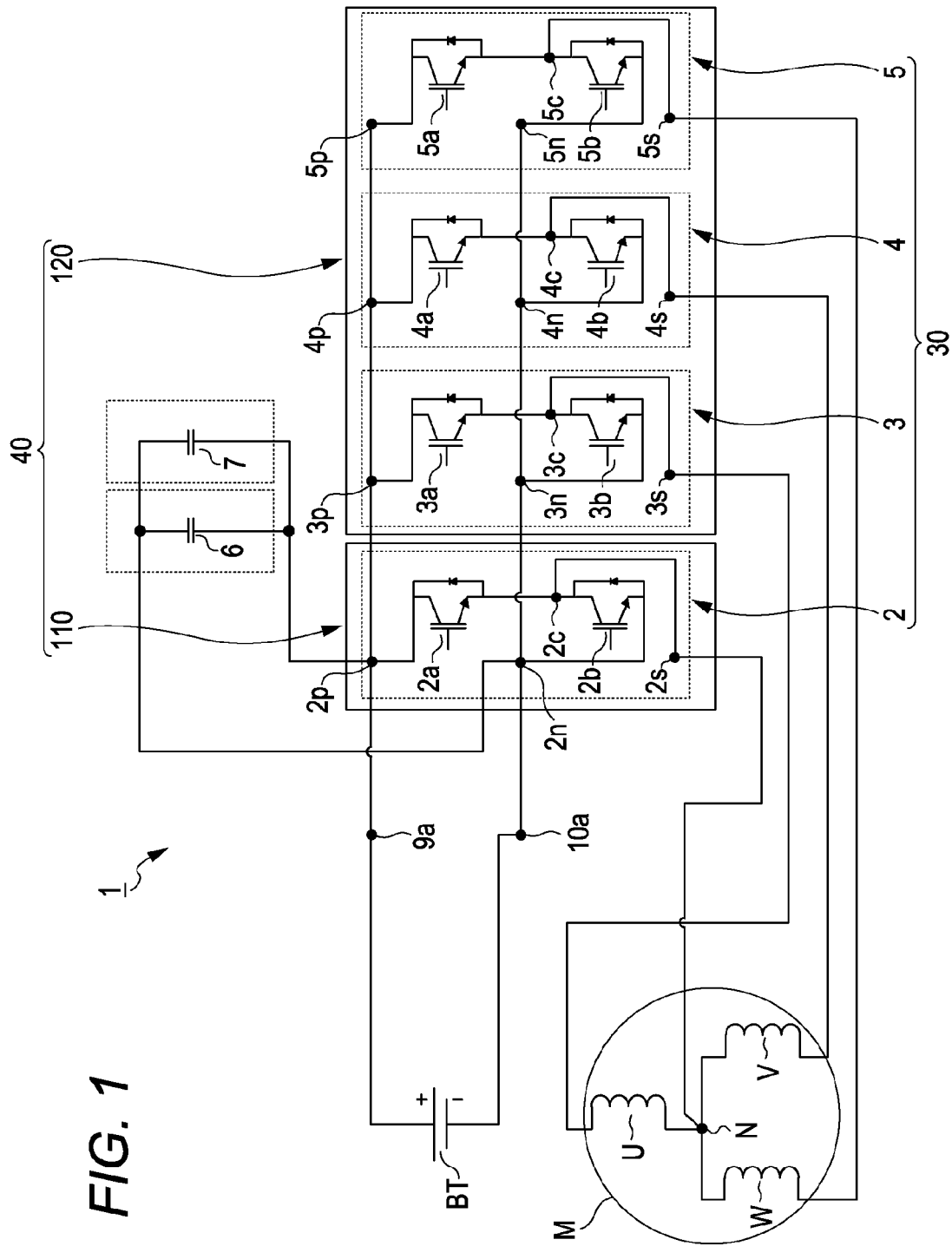
FIG. 1 is a block diagram illustrating an SR motor control apparatus according to a first embodiment.

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

First Embodiment

Figure 2:
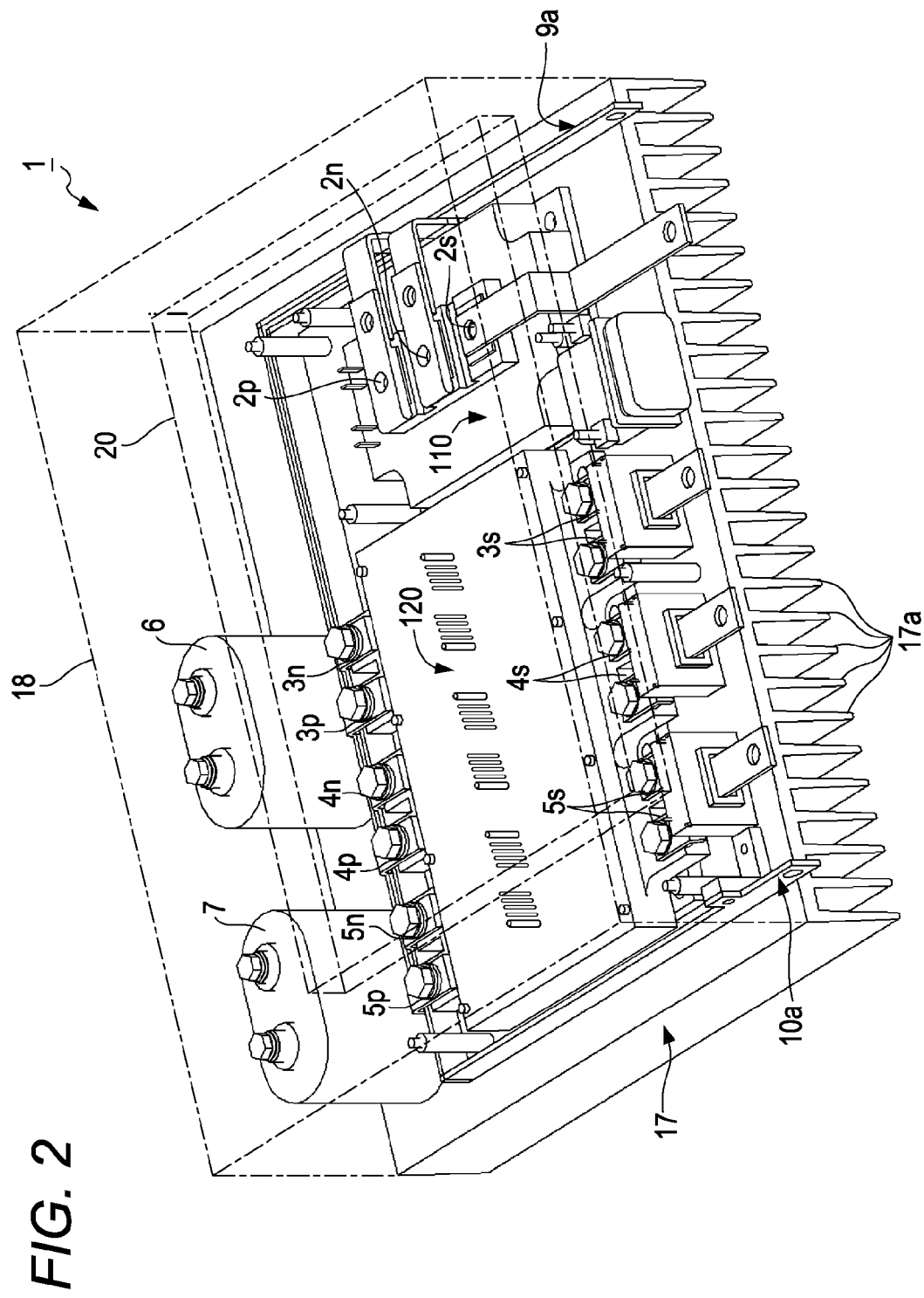
FIG. 2 is a perspective view illustrating the SR motor control apparatus according to the first embodiment.

An SR motor control apparatus 1 according to a first embodiment of the present disclosure will be described with reference to FIG. 1 and FIG. 2. FIG. 1 is a block diagram illustrating the SR motor control apparatus 1. FIG. 2 is a perspective view illustrating the SR motor control apparatus 1.

The SR motor control apparatus 1 mainly includes an aluminum attachment plate 17, a switching unit 40, capacitors 6 and 7, a control board 20, and a case 18. The attachment plate 17 has a plurality of cooling fins 17a. The switching unit 40, the capacitors 6 and 7, and the control board 20 are attached to the attachment plate 17. The case 18 covers the switching unit 40, the capacitors 6 and 7, and the control board 20. A switching circuit 30 is mounted on the switching unit 40.

An SR motor M has a U-phase coil U, a V-phase coil V, and a W-phase coil W. These U-phase coil U, V-phase coil V, and W-phase coil W are connected in a star connection. This star connecting node (the node at which terminals of three coils are coupled) is a neutral node N of the SR motor M. The switching unit 40 has a first power module 110 and a second power module 120. The power modules 110 and 120 are electrically connected to the coils U, V, and W, and the neutral node N. Furthermore, the power modules 110 and 120 are electrically connected to the positive electrode (+) and the negative electrode (−) of a power source (battery) BT. The power modules 110 and 120 operate (turn on and off) such that the turning on and off of an internal semiconductor switching element is switched based on a control signal output from the control board 20. Accordingly, the currents supplied to the coils U, V, and W of the SR motor M are controlled.

The switching circuit 30 has first to fourth half-bridge circuits 2, 3, 4, and 5. The first half-bridge circuit 2 is mounted on the first power module 110 independently of other half-bridge circuits 3 to 5. The second to fourth half-bridge circuits 3 to 5 are mounted on the second power module 120. That is, on the first power module 110, the first half-bridge circuit 2 is mounted, while the second to fourth half-bridge circuits 3 to 5 are not mounted.

The first to fourth half-bridge circuits 2 to 5 of the switching circuit 30 have IGBTs (Insulated Gate Bipolar Transistor) as semiconductor switching elements. The first half-bridge circuit 2 includes two IGBTs 2a and 2b. The IGBT 2a and the IGBT 2b are connected to each other in series at a connecting node 2c to form an element array. Therefore, the first power module 110 on which the first half-bridge circuit 2 is mounted has two IGBTs 2a and 2b. Furthermore, the first power module 110 includes a conductive positive terminal 2p, a conductive negative terminal 2n, and a conductive output/input terminal 2s. The positive terminal 2p is connected to the collector terminal of one IGBT 2a. The negative terminal 2n is connected to the emitter terminal of the other IGBT 2b. The output/input terminal 2s is connected to the connecting node 2c between the IGBT 2a and the IGBT 2b.

The second half-bridge circuit 3 includes two IGBTs 3a and 3b. The IGBT 3a and the IGBT 3b are connected to each other in series at a connecting node 3c to form an element array. The third half-bridge circuit 4 includes two IGBTs 4a and 4b. The IGBT 4a and the IGBT 4b are connected to each other in series at a connecting node 4c to form an element array. The fourth half-bridge circuit 5 includes two IGBTs 5a and 5b. The IGBT 5a and the IGBT 5b are connected to each other in series at a connecting node 5c to form an element array.

As described above, the second to fourth half-bridge circuits 3 to 5 are mounted on the second power module 120. The second power module 120 includes the two IGBTs 3a and 3b in the second half-bridge circuit 3, the two IGBTs 4a and 4b in the third half-bridge circuit 4, and the two IGBTs 5a and 5b in the fourth half-bridge circuit 5. That is, the second power module 120 includes six IGBTs 3a, 3b, 4a, 4b, 5a, and 5b in total.

The second power module 120 includes a conductive positive terminal 3p, a conductive negative terminal 3n, and a conductive output/input terminal 3s. The positive terminal 3p is connected to the collector terminal of one IGBT 3a in the second half-bridge circuit 3. The negative terminal 3n is connected to the emitter terminal of the other IGBT 3b in the second half-bridge circuit 3. The output/input terminal 3s is connected to the connecting node 3c between the IGBT 3a and the IGBT 3b.

Furthermore, the second power module 120 includes a conductive positive terminal 4p, a conductive negative terminal 4n, and a conductive output/input terminal 4s. The positive terminal 4p is connected to the collector terminal of one IGBT 4a in the third half-bridge circuit 4. The negative terminal 4n is connected to the emitter terminal of the other IGBT 4b in the third half-bridge circuit 4. The output/input terminal 4s is connected to the connecting node 4c between the IGBT 4a and the IGBT 4b.

Furthermore, the second power module 120 includes a conductive positive terminal 5p, a conductive negative terminal 5n, and a conductive output/input terminal 5s. The positive terminal 5p is connected to the collector terminal of one IGBT 5a in the fourth half-bridge circuit 5. The negative terminal 5n is connected to the emitter terminal of the other IGBT 5b of the fourth half-bridge circuit 5. The output/input terminal 5s is connected to the connecting node 5c between the IGBT 5a and the IGBT 5b.

Next, a description will be made on connection of the switching unit 40 to the power source BT, each of the coils U, V, and W of the SR motor M, and the neutral node (N) of the SR motor M, and connection of the switching unit 40 to the capacitors 6 and 7.

The positive terminal 2p of the first power module 110 and the positive terminals 3p, 4p, and 5p of the second power module 120 are electrically connected to the positive electrode (+) of the power source BT. The negative terminal 2n of the first power module 110 and the negative terminals 3n, 4n, and 5n of the second power module 120 are electrically connected to the negative electrode (−) of the power source BT.

The output/input terminal 2s of the first power module 110 is electrically connected to the neutral node N of the SR motor M. The output/input terminals 3s, 4s, and 5s of the second power module 120 are electrically connected to the coils U, V, and W of the SR motor M, respectively.

Furthermore, one terminal of the capacitors 6 and 7 are connected to the positive terminal 2p of the first power module 110. The other terminals of the capacitors 6 and 7 are connected to the negative terminal 2n of the first power module 110.

Next, an effect of the SR motor control apparatus 1 of the present embodiment will be described.

The first half-bridge circuit 2 in the SR motor control apparatus 1 is connected to the neutral node N of the SR motor M. This first half-bridge circuit 2 has advantageous features in usage, such as higher frequency of operation and a longer lasting flow of current, compared to other half-bridge circuits 3 to 5. Therefore, the amount of heat generation from the first half-bridge circuit 2 is relatively large. Thus, the characteristics of the first half-bridge circuit 2 (for example, electric capacitance of the IGBT used and/or heat dissipation design) can be different from those of other half-bridge circuits 3 to 5.

In the present embodiment, the first half-bridge circuit 2 having the above-described usage characteristics is mounted on the first power module 110 independently of other half-bridge circuits 3 to 5. This allows for selection of the power module including the IGBTs that meet the usage characteristics of the first half-bridge circuit 2 as the first power module 110 without requiring consideration of characteristics of other half-bridge circuits 3 to 5. Furthermore, the heat dissipation design for the first power module 110 can be adapted to the usage characteristics of the first half-bridge circuit 2 without requiring consideration of the characteristics of other half-bridge circuits 3 to 5.

Second Embodiment

Figure 3:
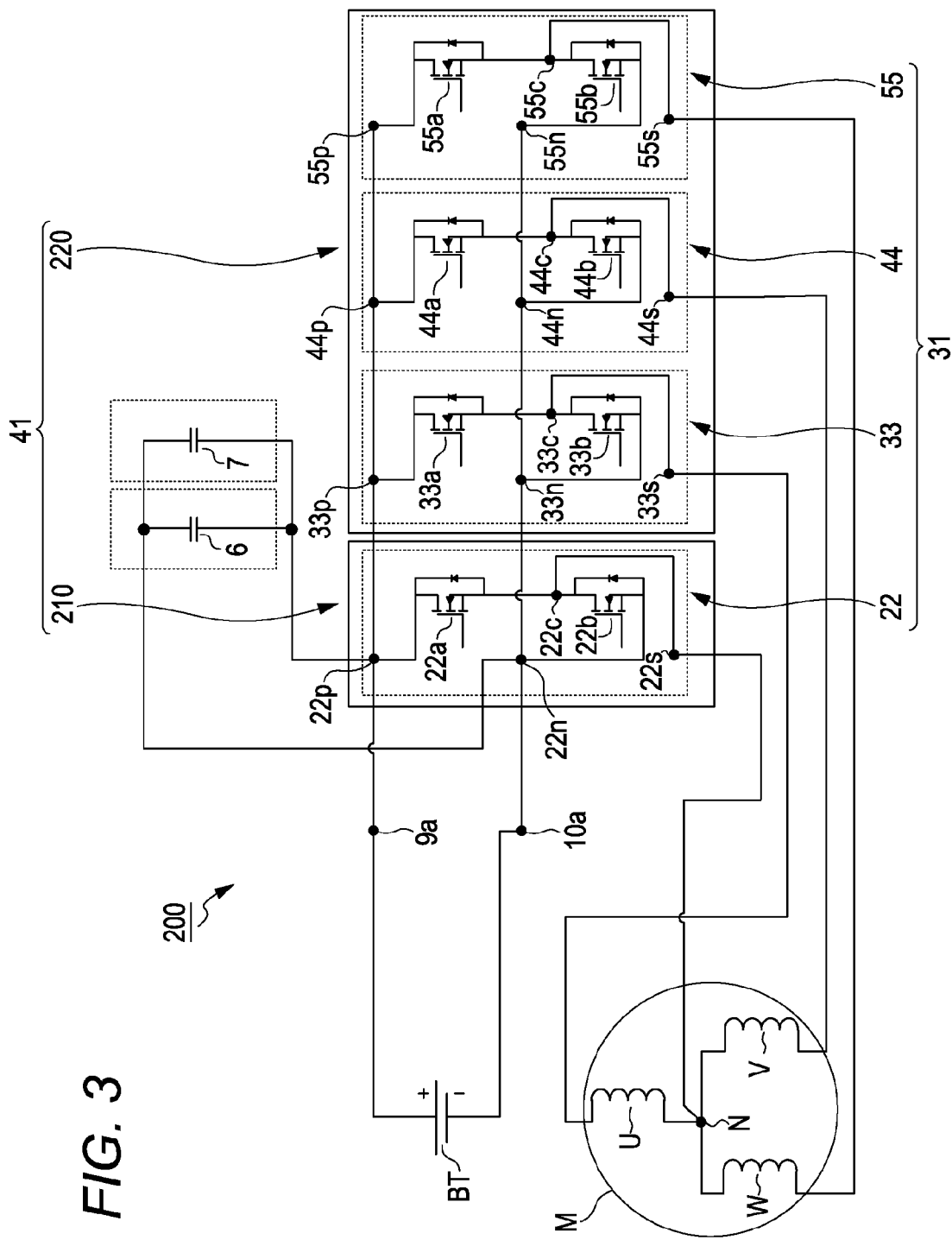
FIG. 3 is a block diagram illustrating an SR motor control apparatus according to a second embodiment.

Next, an SR motor control apparatus 200 according to a second embodiment of the present disclosure will be described with reference to FIG. 3. FIG. 3 is a block diagram illustrating the SR motor control apparatus 200.

The SR motor control apparatus 200 has a different type of semiconductor switching element included in the switching unit (first and second power modules) than that in the SR motor control apparatus 1 illustrated in FIG. 1 and FIG. 2. Other structures of the SR motor control apparatus 200 are the same as those of the SR motor control apparatus 1. Thus, in the present embodiment, the first and second power modules will be described. For other members, the same reference numerals are provided and explanation will be omitted.

A switching unit 41 in the SR motor control apparatus 200 has first and second power modules 210 and 220 similarly to the SR motor control apparatus 1. A first half-bridge circuit 22 is mounted on the first power module 210. Second to fourth half-bridge circuits 33, 44, and 55 are mounted on the second power module 220.

The first to fourth half-bridge circuits 22, 33, 44, and 55 of a switching circuit 31 have power MOSFETs as semiconductor switching elements. The first half-bridge circuit 22 includes two power MOSFETs 22a and 22b. The power MOSFET 22a and the power MOSFET 22b are connected to each other in series at a connecting node 22c to form an element array. Furthermore, the first power module 210 on which the first half-bridge circuit 22 is mounted includes a conductive positive terminal 22p, a conductive negative terminal 22n, and a conductive output/input terminal 22s. The positive terminal 22p is connected to the drain terminal of one FET 22a. The negative terminal 22n is connected to the source terminal of the other FET 22b. The output/input terminal 22s is connected to the connecting node 22c between the FET 22a and the FET 22b.

The second half-bridge circuit 33 includes two power MOSFETs 33a and 33b. The power MOSFET 33a and the power MOSFET 33b are connected to each other in series at a connecting node 33c to form an element array. The third half-bridge circuit 44 includes two power MOSFETs 44a and 44b. The power MOSFET 44a and the power MOSFET 44b are connected to each other in series at a connecting node 44c to form an element array. The fourth half-bridge circuit 55 includes two power MOSFETs 55a and 55b. The power MOSFET 55a and the power MOSFET 55b are connected to each other in series at a connecting node 55c to form an element array.

As described above, the second to fourth half-bridge circuits 33 to 55 are mounted on the second power module 220. The second power module 220 includes the two FETs 33a and 33b in the second half-bridge circuit 33, the two FETs 44a and 44b in the third half-bridge circuit 44, and the two FETs 55a and 55b in the fourth half-bridge circuit 55. That is, the second power module 220 includes six FETs 33a, 33b, 44a, 44b, 55a, and 55b in total.

The second power module 220 includes a conductive positive terminal 33p, a conductive negative terminal 33n, and a conductive output/input terminal 33s. The positive terminal 33p is connected to the drain terminal of one FET 33a of the second half-bridge circuit 33. The negative terminal 33n is connected to the source terminal of the other FET 33b of the second half-bridge circuit 33. The output/input terminal 33s is connected to the connecting node 33c between the FET 33a and the FET 33b.

Furthermore, the second power module 220 includes a conductive positive terminal 44p, a conductive negative terminal 44n, and a conductive output/input terminal 44s. The positive terminal 44p is connected to the drain terminal of one FET 44a of the third half-bridge circuit 44. The negative terminal 44n is connected to the source terminal of the other FET 44b of the third half-bridge circuit 44. The output/input terminal 44s is connected to the connecting node 44c between the FET 44a and the FET 44b.

Furthermore, the second power module 220 includes a conductive positive terminal 55p, a conductive negative terminal 55n, and a conductive output/input terminal 55s. The positive terminal 55p is connected to the drain terminal of one FET 55a of the fourth half-bridge circuit 55. The negative terminal 55n is connected to the source terminal of the other FET 55b of the fourth half-bridge circuit 55. The output/input terminal 55s is connected to the connecting node 55c between the FET 55a and the FET 55b.

The positive terminal 22p of the first power module 210 and the positive terminals 33p, 44p, and 55p of the second power module 220 are electrically connected to the positive electrode (+) of the power source BT. The negative terminal 22n of the first power module 210 and the negative terminals 33n, 44n, and 55n of the second power module 220 are electrically connected to the negative electrode (−) of the power source BT.

The output/input terminal 22s of the first power module 210 is electrically connected to the neutral node N of the SR motor M. The output/input terminals 33s, 44s, and 55s of the second power module 220 are electrically connected to the coils U, V, and W of the SR motor M, respectively.

Next, an effect of the SR motor control apparatus 200 of the present embodiment will be described.

The first half-bridge circuit 22 in the SR motor control apparatus 200 is connected to the neutral node N of the SR motor M. This first half-bridge circuit 22 has usage characteristics that it is operated more frequently and the current flows for a longer time period compared to other half-bridge circuits 33, 44, and 55. Therefore, the amount of heat generation at the first half-bridge circuit 22 is relatively large. Thus, the characteristics of the first half-bridge circuit 22 (for example, electric capacitance of the FET used and/or heat dissipation design) can be different from those of other half-bridge circuits 33, 44, and 55.

In the present embodiment, the first half-bridge circuit 22 having the above-described usage characteristics is mounted on the first power module 210 independently of other half-bridge circuits 33, 44, and 55. This allows for selection of the power module including the FETs that meet the usage characteristics of the first half-bridge circuit 22 as the first power module 210 without requiring consideration of characteristics of other half-bridge circuits 33, 44, and 55. Furthermore, the heat dissipation design for the first power module 210 can be adapted to the usage characteristics of the first half-bridge circuit 22 without requiring consideration of the characteristics of other half-bridge circuits 33, 44, and 55.

Third Embodiment

Figure 4:
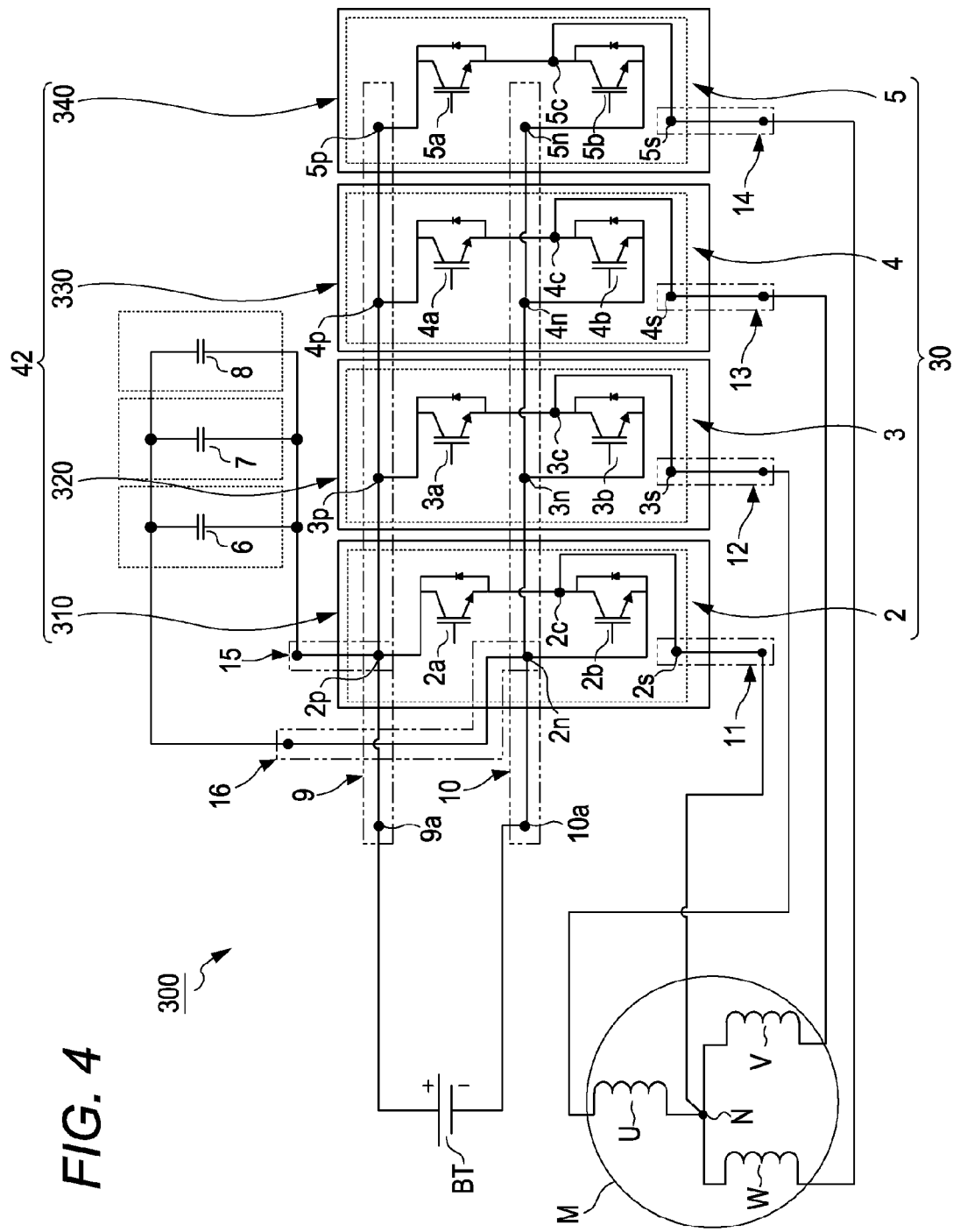
FIG. 4 is a block diagram illustrating an SR motor control apparatus according to a third embodiment.
Figure 5:
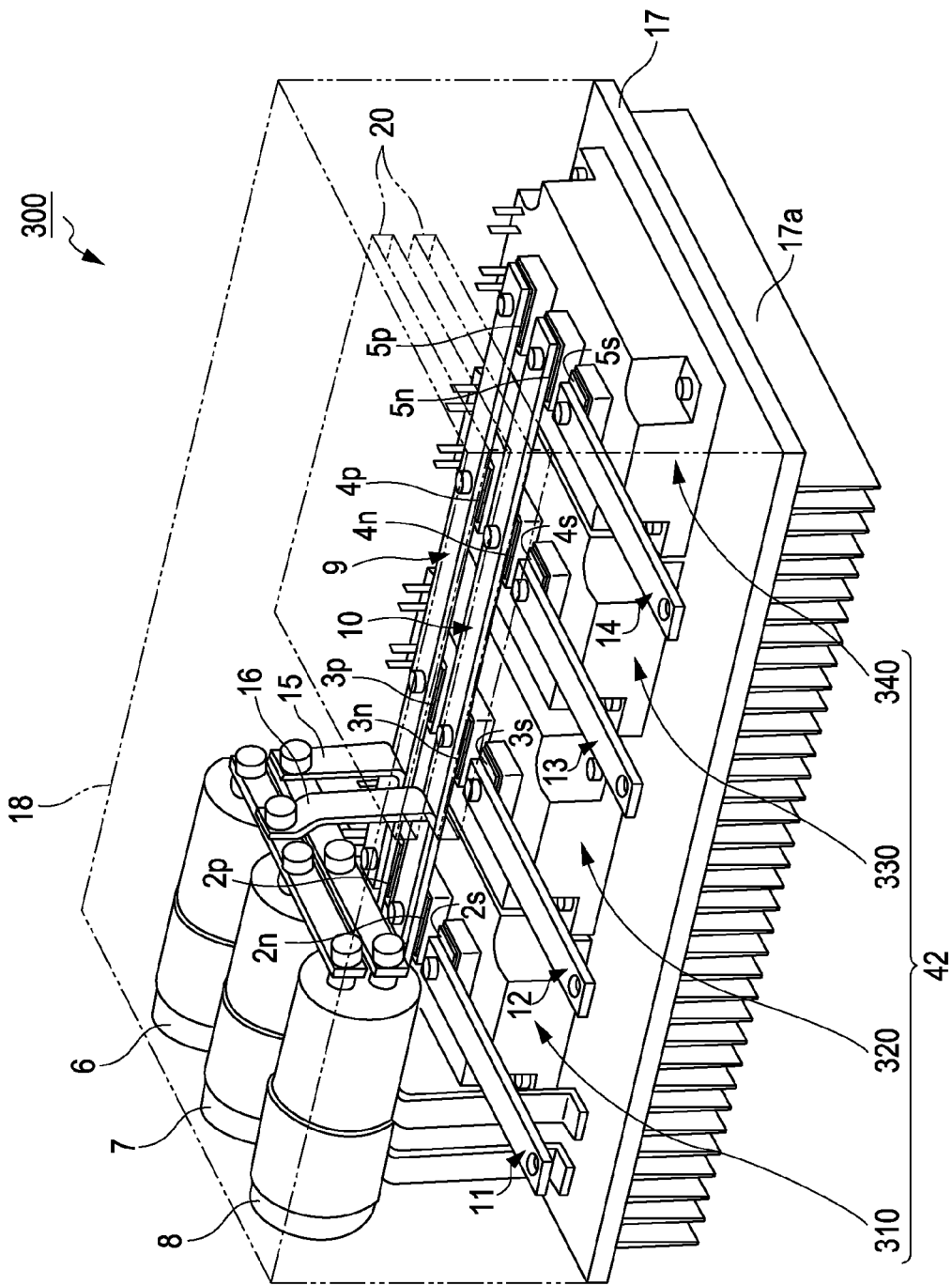
FIG. 5 is a perspective view illustrating the SR motor control apparatus according to the third embodiment.
Figure 6:
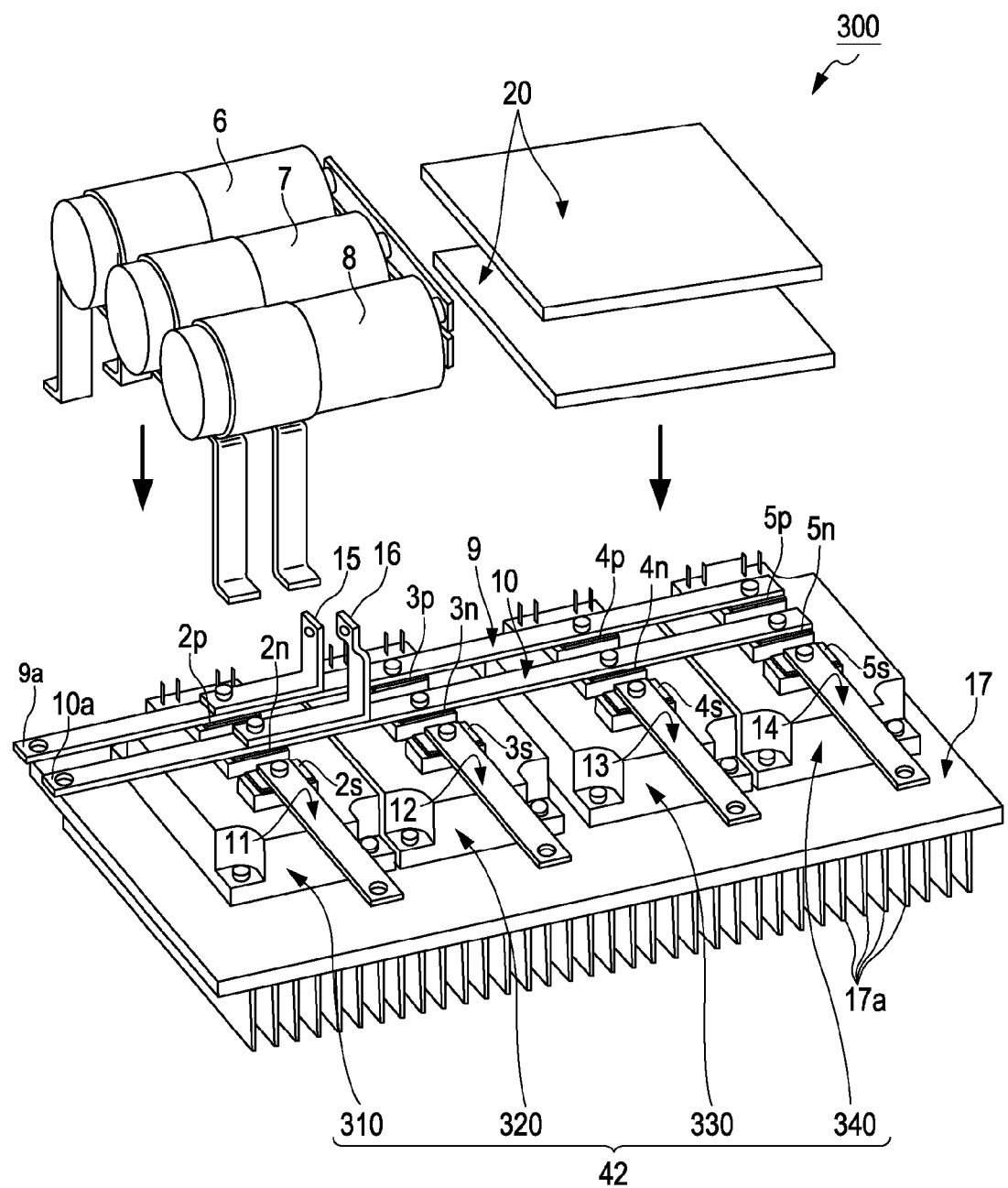
FIG. 6 is a developed perspective view illustrating the SR motor control apparatus according to the third embodiment.

Next, an SR motor control apparatus 300 according to a third embodiment will be described with reference to FIG. 4 to FIG. 6. FIG. 4 is a block diagram illustrating the SR motor control apparatus 300. FIG. 5 is a perspective view illustrating the SR motor control apparatus 300. FIG. 6 is a developed perspective view illustrating the SR motor control apparatus 300.

As illustrated in FIG. 5, the SR motor control apparatus 300 mainly includes an aluminum attachment plate 17, a switching unit 42, capacitors 6, 7, and 8, a control board 20, and a case 18. The attachment plate 17 has a plurality of cooling fins 17a. The switching unit 42, the capacitors 6, 7, and 8, and the control board 20 are attached to the attachment plate 17. The case 18 covers the switching unit 42, the capacitors 6, 7, and 8, and the control board 20. Furthermore, the SR motor control apparatus 300 includes a positive electrode bus bar 9, a negative electrode bus bar 10, four bus bars 11, 12, 13, and 14, and capacitor bus bars 15 and 16. The positive electrode bus bar 9 and the negative electrode bus bar 10 connect the power source BT to the switching unit 42. Four bus bars 11, 12, 13, and 14 connect an SR motor M to the switching unit 42. The capacitor bus bars 15 and 16 are capacitor connecting members for connecting the capacitors 6, 7, and 8 to the switching unit 42. A switching circuit 30 is mounted on the switching unit 42.

The SR motor M has a U-phase coil U, a V-phase coil V, and a W-phase coil W. These U-phase coil U, V-phase coil V, and W-phase coil W are connected in a star connection. This star connecting node (the node at which terminals of three coils are coupled) is a neutral node N of the SR motor M. The switching unit 42 has first to fourth power modules 310, 320, 330, and 340, which have the same structure. The power modules 310, 320, 330, and 340 are connected to the coils U, V, and W, and the neutral node N via the bus bars 11, 12, 13, and 14, respectively. The power modules 310, 320, 330, and 340 are connected to the positive electrode (+) of a power source (battery) BT via the positive electrode bus bar 9. Furthermore, the power modules 310, 320, 330, and 340 are connected to the negative electrode (−) of the power source (battery) BT via the negative electrode bus bar 10. The power modules 310, 320, 330, and 340 are turned on and off based on a control signal from the control board 20. Accordingly, the currents supplied to the coils U, V, and W of the SR motor M are controlled.

The switching circuit 30 has first to fourth half-bridge circuits 2, 3, 4, and 5. The first half-bridge circuit 2 is mounted on the first power module 310 independently of other half-bridge circuits 3 to 5. The second to fourth half-bridge circuits 3 to 5 are also mounted on the second to fourth power modules 320, 330, and 340 independently of each other.

The first to fourth half-bridge circuits 2 to 5 of the switching circuit 30 have IGBTs as semiconductor switching elements. The first half-bridge circuit 2 includes two IGBTs 2a and 2b. The IGBT 2a and the IGBT 2b are connected to each other in series at a connecting node 2c to form an element array. The second half-bridge circuit 3 includes two IGBTs 3a and 3b. The IGBT 3a and the IGBT 3b are connected to each other in series at a connecting node 3c to form an element array. The third half-bridge circuit 4 includes two IGBTs 4a and 4b. The IGBT 4a and the IGBT 4b are connected to each other in series at a connecting node 4c to form an element array. The fourth half-bridge circuit 5 includes two IGBTs 5a and 5b. The IGBT 5a and the IGBT 5b are connected to each other in series at a connecting node 5c to form an element array.

As described above, the first power module 310 on which the first half-bridge circuit 2 is mounted has two IGBTs 2a and 2b connected in series at the connecting node 2c. Furthermore, the first power module 310 includes a conductive positive terminal 2p, a conductive negative terminal 2n, and a conductive output/input terminal 2s. The positive terminal 2p is connected to the collector terminal of one IGBT 2a. The negative terminal 2n is connected to the emitter terminal of the other IGBT 2b. The output/input terminal 2s is connected to the connecting node 2c between the IGBT 2a and the IGBT 2b. The positive terminal 2p, the negative terminal 2n, and the output/input terminal 2s are aligned in this order almost straight on the upper surface of the first power module 310.

Similarly, the second power module 320 on which the second half-bridge circuit 3 is mounted has two IGBTs 3a and 3b connected in series at the connecting node 3c. Furthermore, the second power module 320 includes a conductive positive terminal 3p, a conductive negative terminal 3n, and a conductive output/input terminal 3s. The positive terminal 3p is connected to the collector terminal of one IGBT 3a. The negative terminal 3n is connected to the emitter terminal of the other IGBT 3b. The output/input terminal 3s is connected to the connecting node 3c between the IGBT 3a and the IGBT 3b. The positive terminal 3p, the negative terminal 3n, and the output/input terminal 3s are aligned in this order almost straight on the upper surface of the second power module 320.

Similarly, the third power module 330 on which the third half-bridge circuit 4 is mounted has two IGBTs 4a and 4b connected in series at the connecting node 4c. Furthermore, the third power module 330 includes a conductive positive terminal 4p, a conductive negative terminal 4n, and a conductive output/input terminal 4s. The positive terminal 4p is connected to the collector terminal of one IGBT 4a. The negative terminal 4n is connected to the emitter terminal of the other IGBT 4b. The output/input terminal 4s is connected to the connecting node 4c between the IGBT 4a and the IGBT 4b. The positive terminal 4p, the negative terminal 4n, and the output/input terminal 4s are aligned in this order almost straight on the upper surface of the third power module 330.

Furthermore, the fourth power module 340 on which the fourth half-bridge circuit 5 is mounted has two IGBTs 5a and 5b connected in series at the connecting node 5c. Furthermore, the fourth power module 340 includes a conductive positive terminal 5p, a conductive negative terminal 5n, and a conductive output/input terminal 5s. The positive terminal 5p is connected to the collector terminal of one IGBT 5a. The negative terminal 5n is connected to the emitter terminal of the other IGBT 5b. The output/input terminal 5s is connected to the connecting node 5c between the IGBT 5a and the IGBT 5b. The positive terminal 5p, the negative terminal 5n and the output/input terminal 5s are aligned in this order almost straight on the upper surface of the fourth power module 340.

The neutral node bus bar 11 is attached to the output/input terminal 2s of the first power module 310. The neutral node bus bar 11 includes a rod-shaped conductive plate member. The neutral node bus bar 11 is connected to the neutral node N of the SR motor M. The U-phase bus bar 12 is attached to the output/input terminal 3s of the second power module 320. The U-phase bus bar 12 includes a rod-shaped conductive plate member. The U-phase bus bar 12 is connected to the U-phase coil of the SR motor. The V-phase bus bar 13 is attached to the output/input terminal 4s of the third power module 330. The V-phase bus bar 13 includes a rod-shaped conductive plate member. The V-phase bus bar 13 is connected to the V-phase coil of the SR motor. The W-phase bus bar 14 is attached to the output/input terminal 5s of the fourth power module 340. The W-phase bus bar 14 includes a rod-shaped conductive plate member. The W-phase bus bar 14 is connected to the W-phase coil of the SR motor.

Next, a description will be made on arrangement of the first to fourth power modules 310, 320, 330, and 340, and attachment of the positive electrode bus bar 9 and the negative electrode bus bar 10 to the first to fourth power modules 310, 320, 330, and 340.

As illustrated in FIG. 5, the power modules 310, 320, 330, and 340 are aligned in this order almost straight, in parallel, and close to each other. The power modules 310, 320, 330, and 340 are arranged such that the positive terminals 2p, 3p, 4p, and 5p are aligned almost straight and the negative terminals 2n, 3n, 4n, and 5n are aligned almost straight.

Furthermore, the positive electrode bus bar 9 includes a rod-shaped (straight) conductive plate member. One end of the positive electrode bus bar 9 includes a power source connection portion 9a to be connected to the power source BT. The positive electrode bus bar 9 is connected to the positive terminals 2p, 3p, 4p, and 5p of the first to fourth power modules 310, 320, 330, and 340 by screw-fastening. Similarly, the negative electrode bus bar 10 includes a rod-shaped (straight) conductive plate member. One end of the negative electrode bus bar 10 includes a power source connection portion 10a to be connected to the power source BT. The negative electrode bus bar 10 is connected to the negative terminals 2n, 3n, 4n, and 5n of the first to fourth power modules 310, 320, 330, and 340 by screw-fastening. It is noted that both of the power source connection portion 9a of the positive electrode bus bar 9 and the power source connection portion 10a of the negative electrode bus bar 10 are arranged on the same side of the SR motor control apparatus 300. The power source connection portion 9a and the power source connection portion 10a are arranged so as to protrude in the same direction out of the case 18.

In the SR motor control apparatus 300, the positive terminals 2p, 3p, 4p, and 5p in the power modules 310, 320, 330, and 340 are aligned almost straight. Thus, the positive electrode bus bar 9 connecting these positive terminals 2p, 3p, 4p, and 5p together can have an almost straight rod shape having no bending portion. Therefore, the positive electrode bus bar 9 can be formed in a simple shape. Thus, no complicated processing is required to form the positive electrode bus bar 9. Furthermore, since the positive electrode bus bar 9 has the simple shape, high yield rate can be ensured in production of the positive electrode bus bar 9. Therefore, the positive electrode bus bar 9 can be produced at a low cost. It is noted that the negative electrode bus bar 10 has almost the same shape as the positive electrode bus bar 9. Thus, the negative electrode bus bar 10 also has the same advantage as the positive electrode bus bar 9.

Furthermore, the neutral node bus bar 11 is attached to the first power module 310. This first power module 310 is arranged closer to the power source connection portion 9a of the positive electrode bus bar 9 and the power source connection portion 10a of the negative electrode bus bar 10 than other second to fourth power modules 320, 330, and 340. That is, in the switching unit 42, electric power from the power source BT is supplied to the power source connection portions 9a and 10a. Current paths from the power source connection portions 9a and 10a to the first power module 310 are shorter than current paths from the power source connection portions 9a and 10a to other power modules 320, 330, and 340.

When the SR motor M is driven (regenerated), the first power module 310 to which the neutral node bus bar 11 is attached is almost always in the turning on and off operation. On the other hand, other power modules 320, 330, and 340 are turned on and off intermittently. Therefore, the time period when the current flows between the power source connection portion 9a of the positive electrode bus bar 9 and the power source connection portion 10a of the negative electrode bus bar 10 and the first power module 310 is longer than the time period when the current flows between the power source connection portions 9a and 10a and other power modules 320, 330, and 340. The first power module 310 is arranged in the closest position to the power source connection portions 9a and 10a. This allows for relatively small impedance between the first power module 310 and the power source connection portions 9a and 10a. Thus, electrical loss can be reduced in the path between the power source connection portions 9a and 10a and the first power module 310 that has a longer conduction time. As a result, efficiency of the SR motor control apparatus 300 can be increased.

Furthermore, as described above, the SR motor control apparatus 300 includes the capacitor bus bars 15 and 16. These are capacitor connection members for connecting the capacitors 6, 7, and 8 to the switching unit 42. As illustrated in FIG. 5, the capacitor bus bars 15 and 16 include L-shape conductive plate members. Furthermore, one end of the capacitor bus bar 15 is connected to the positive terminal 2p of the first power module 310 by screw-fastening, while the other end is connected to the capacitors 6, 7, and 8 by screw-fastening. One end of the capacitor bus bar 16 is connected to the negative terminal 2n of the first power module 310 by screw-fastening, while the other end is connected to the capacitors 6, 7, and 8 by screw-fastening.

The capacitors 6, 7, and 8 are provided for compensating fluctuation (drop) in a voltage value of the power source BT. The current from the capacitors 6, 7, and 8 is supplied to the power modules 310, 320, 330, and 340 via the capacitor bus bars 15 and 16. In this way, the current is supplied from the capacitors 6, 7, and 8 to the power modules 310, 320, 330, and 340 in the SR motor control apparatus 300. Furthermore, as described above, when the SR motor M is driven (regenerated), unlike other power modules 320, 330, and 340, the first power module 310 to which the neutral node bus bar 11 is attached is almost always in the turning on and off operation. Thus, the time period when the current flows between the capacitors 6, 7, and 8 and the first power module 310 is longer than the time period when the current flows between the capacitors 6, 7, and 8 and other power modules 320, 330, and 340. In the switching unit 42 in which such current flows, a current path to the capacitors 6, 7, and 8 in the power module 310 is shorter than those in other power modules 320, 330, and 340, as described above. This allows for relatively small impedance between the capacitors 6, 7, and 8 and the first power module 310. Thus, the electrical loss can be reduced in the path between the capacitors 6, 7, and 8 and the first power module 2 that has a longer conduction time. As a result, efficiency of the SR motor control apparatus 300 can be increased.

Figure 7:
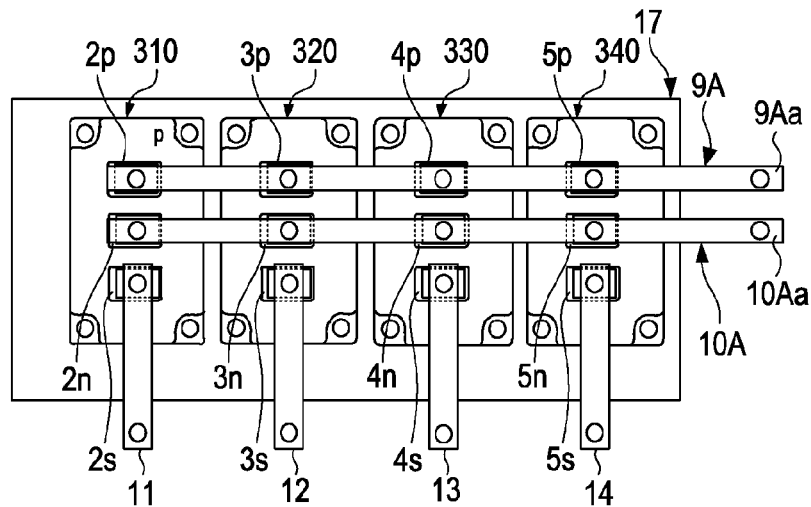
FIG. 7 is a diagram illustrating a first modified example of the SR motor control apparatus of the third embodiment.
Figure 8:
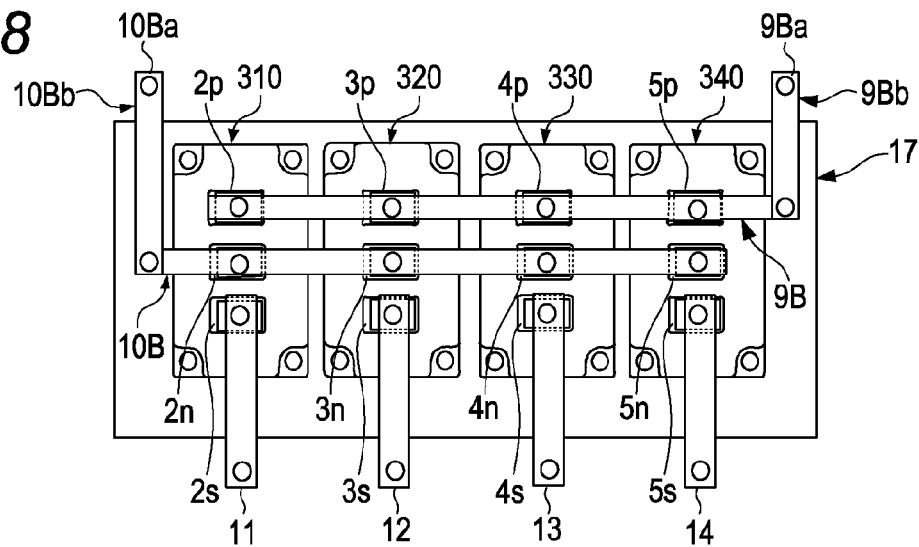
FIG. 8 is a diagram illustrating a second modified example of the SR motor control apparatus of the third embodiment.
Figure 9:
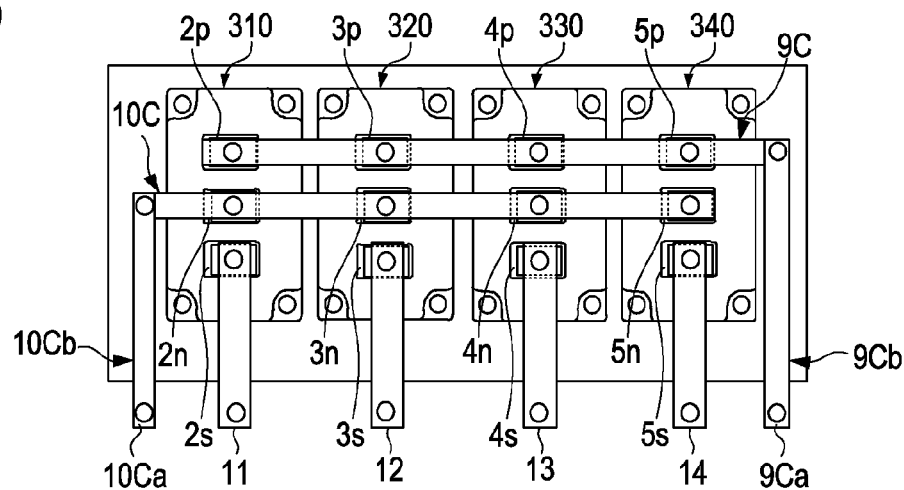
FIG. 9 is a diagram illustrating a third modified example of the SR motor control apparatus of the third embodiment.

Next, FIG. 7 to FIG. 9 illustrate three modified examples (first to third modified examples) for the positive electrode bus bar 9 and the negative electrode bus bar 10 in the SR motor control apparatus 300. The modifications in these modified examples are for the shape of the positive electrode bus bar and the negative electrode bus bar and for the position of the power source connection portions.

In the first modified example illustrated in FIG. 7, a positive electrode bus bar 9A and a negative electrode bus bar 10A are rod-shaped similarly to the positive electrode bus bar 9 and the negative electrode bus bar 10. However, the positive electrode bus bar 9A and the negative electrode bus bar 10A are provided so as to protrude from the fourth power module 340 to outside of the case 18. The protruding portions (ends) of the positive electrode bus bar 9A and the negative electrode bus bar 10A are provided with power source connection portions 9Aa and 10Aa.

In the second modified example illustrated in FIG. 8, a positive electrode bus bar 9B and a negative electrode bus bar 10B are rod-shaped similarly to the positive electrode bus bar 9 and the negative electrode bus bar 10. A power source bus bar 9Bb is integrally connected to a part of the positive electrode bus bar 9B that extends outward from the fourth power module 340. The power source bus bar 9Bb is provided so as to protrude to outside of the case 18 (see FIG. 5) in the direction opposite to the extending direction of the U-phase bus bar 12, the V-phase bus bar 13, and the W-phase bus bar 14. The protruding portion (end) of the power source bus bar 9Bb is provided with a power source connection portion 9Ba.

Similarly, a power source bus bar 10Bb is integrally connected to a part of the negative electrode bus bar 10B that extends outward from the first power module 310. This power source bus bar 10Bb is provided so as to protrude to outside of the case 18 in the direction opposite to the extending direction of the U-phase bus bar 12, the V-phase bus bar 13, and the W-phase bus bar 14. The protruding portion (end) of the power source bus bar 10Bb is provided with a power source connection portion 10Ba. It is noted that, in this second modified example, the positive electrode bus bar 9B and the power source bus bar 9Bb as well as the negative electrode bus bar 10B and the power source bus bar 10Bb may be formed as the same member in a monolithic manner instead of as individual members.

In the third modified example illustrated in FIG. 9, a positive electrode bus bar 9C and a negative electrode bus bar 10C are rod-shaped similarly to the positive electrode bus bar 9 and the negative electrode bus bar 10. A power source bus bar 9Cb is integrally connected to a part of the positive electrode bus bar 9C that extends outward from the fourth power module 340. The power source bus bar 9Cb is provided so as to protrude to outside of the case 18 in the extending direction of the U-phase bus bar 12, the V-phase bus bar 13, and the W-phase bus bar 14. The protruding portion (end) of the power source bus bar 9Cb is provided with a power source connection portion 9Ca.

Similarly, a power source bus bar 10Cb is integrally connected to a part of the negative electrode bus bar 10C that extends outward from the first power module 310. This power source bus bar 10Cb is provided so as to protrude to outside of the case 18 in the extending direction of the U-phase bus bar 12, the V-phase bus bar 13, and the W-phase bus bar 14. The protruding portion (end) of the power source bus bar 10Cb is provided with a power source connection portion 10Ca. It is noted that, in this third modified example, the positive electrode bus bar 9C and the power source bus bar 9Cb as well as the negative electrode bus bar 10C and the power source bus bar 10Cb may be formed as the same member in a monolithic manner instead of as individual members.

Fourth Embodiment

Figure 10:
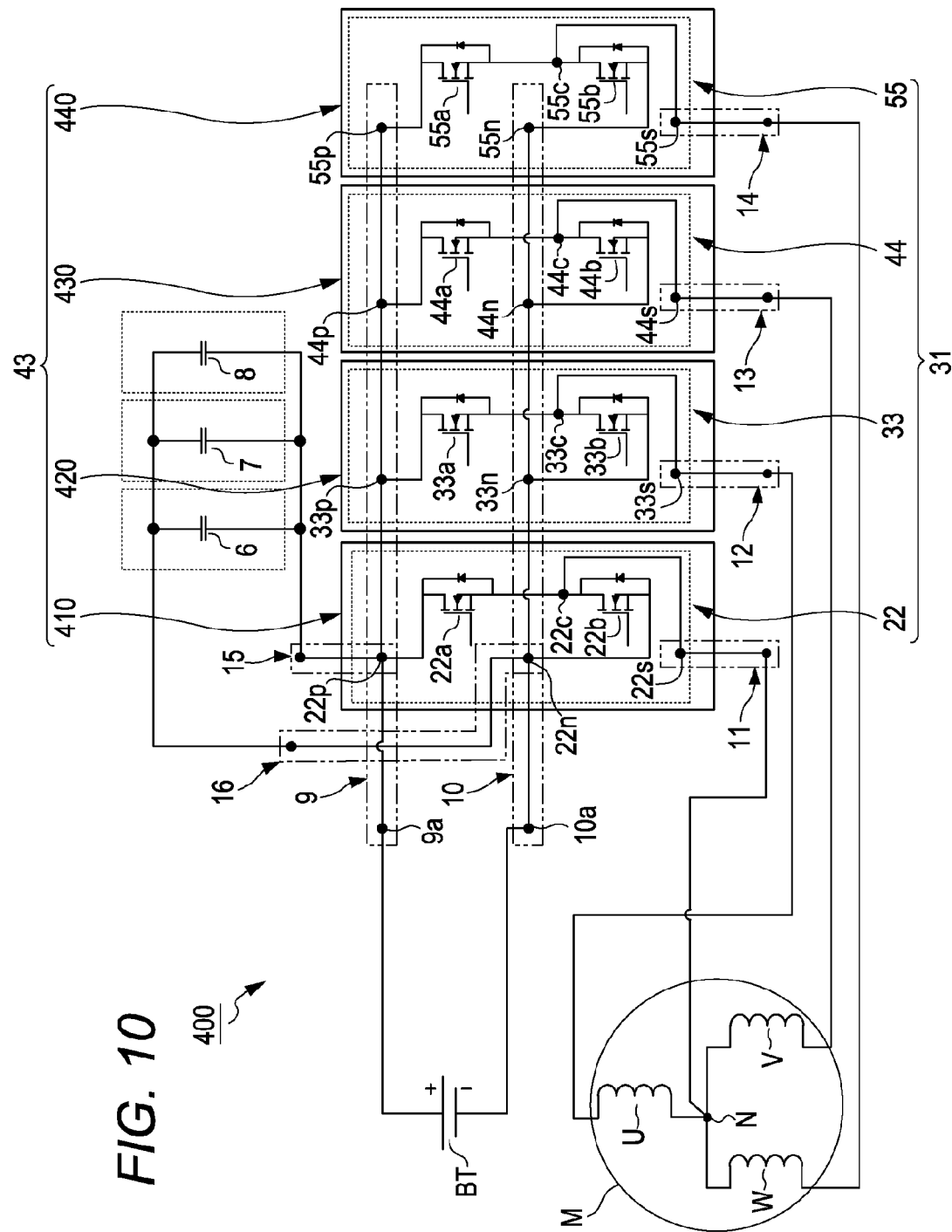
FIG. 10 is a block diagram illustrating an SR motor control apparatus according to a fourth embodiment.

Next, an SR motor control apparatus 400 according to a fourth embodiment of the present disclosure will be described with reference to FIG. 10. FIG. 10 is a block diagram illustrating the SR motor control apparatus 400.

The SR motor control apparatus 400 has a different type of semiconductor switching element in the switching unit (the first to fourth power modules) than that used in the SR motor control apparatus 300 illustrated in FIG. 4 to FIG. 6. The rest of structures of the SR motor control apparatus 400 is the same as that of the SR motor control apparatus 300. Thus, the first to fourth power modules will be described in the present embodiment. For other members, the same reference numerals are provided and explanation will be omitted A switching unit 43 in the SR motor control apparatus 400 has first to fourth power modules 410, 420, 430, and 440, which have the same structure. The switching circuit 31 of the SR motor control apparatus 400 has first to fourth half-bridge circuits 22, 33, 44, and 55. The first half-bridge circuit 22 is mounted on the first power module 410 independently of other half-bridge circuits 33, 44, and 55. On the other hand, the second to fourth half-bridge circuits 33, 44, and 55 are also mounted on the second to fourth power modules 420, 430, and 440 independently of each other.

The first to fourth half-bridge circuits 22, 33, 44, and 55 of a switching circuit 31 have FETs as semiconductor switching elements. The first half-bridge circuit 22 includes two FETs 22a and 22b. The FET 22a and the FET 22b are connected to each other in series at a connecting node 22c to form an element array. The second half-bridge circuit 33 includes two FETs 33a and 33b. The FET 33a and the FET 33b are connected to each other in series at a connecting node 33c to form an element array. The third half-bridge circuit 44 includes two FETs 44a and 44b. The FETs 44a and the FET 44b are connected to each other in series at a connecting node 44c to form an element array. The fourth half-bridge circuit 55 includes two FETs 55a and 55b. The FET 55a and the FET 55b are connected to each other in series at a connecting node 55c to form an element array.

As described above, the first power module 410 on which the first half-bridge circuit 22 is mounted has two FETs 22a and 22b connected in series at the connecting node 22c. Furthermore, the first power module 410 includes a conductive positive terminal 22p, a conductive negative terminal 22n, and a conductive output/input terminal 22s. The positive terminal 22p is connected to the drain terminal of one FET 22a. The negative terminal 22n is connected to the source terminal of the other FET 22b. The output/input terminal 22s is connected to the connecting node 22c between the FET 22a and the FET 22b. The positive terminal 22p, the negative terminal 22n, and the output/input terminal 22s are aligned in this order almost straight on the upper surface of the first power module 410.

Similarly, the second power module 420 on which the second half-bridge circuit 33 is mounted has two FETs 33a and 33b connected in series at the connecting node 33c. Furthermore, the second power module 420 includes a conductive positive terminal 33p, a conductive negative terminal 33n, and a conductive output/input terminal 33s. The positive terminal 33p is connected to the drain terminal of one FET 33a. The negative terminal 33n is connected to the source terminal of the other FET 33b. The output/input terminal 33s is connected to the connecting node 33c between the FET 33a and the FET 33b. The positive terminal 33p, the negative terminal 33n, and the output/input terminal 33s are aligned in this order almost straight on the upper surface of the second power module 420.

Similarly, the third power module 430 on which the third half-bridge circuit 44 is mounted has two FETs 44a and 44b connected in series at the connecting node 44c. Furthermore, the third power module 430 includes a conductive positive terminal 44p, a conductive negative terminal 44n, and a conductive output/input terminal 44s. The positive terminal 44p is connected to the drain terminal of one FET 44a. The negative terminal 44n is connected to the source terminal of the other FET 44b. The output/input terminal 44s is connected to the connecting node 44c between the FET 44a and the FET 44b. The positive terminal 44p, the negative terminal 44n, and the output/input terminal 44s are aligned in this order almost straight on the upper surface of the third power module 430.

Furthermore, the fourth power module 440 on which the fourth half-bridge circuit 55 is mounted has two FETs 55a and 55b connected in series at the connecting node 55c. Furthermore, the fourth power module 440 includes a conductive positive terminal 55p, a conductive negative terminal 55n, and a conductive output/input terminal 55s. The positive terminal 55p is connected to the drain terminal of one FET 55a. The negative terminal 55n is connected to the source terminal of the other FET 55*b*. The output/input terminal 55*s* is connected to the connecting node 55*c* between the FET 55*a* and the FET 55*b*. The positive terminal 55*p*, the negative terminal 55*n*, and the output/input terminal 55*s* are aligned in this order almost straight on the upper surface of the fourth power module 440.

In addition, a purpose of the present disclosure is to mount a half-bridge circuit on a power module taking into consideration of usage characteristics of the half-bridge circuit.

An SR motor control apparatus according to an aspect of the present disclosure includes a switching circuit. This switching circuit is connected to a U-phase coil, a V-phase coil, and a W-phase coil connected in a star connection and a neutral node of these coils of an SR motor. Furthermore, this switching circuit is connected to a positive electrode and a negative electrode of a power source. This switching circuit controls a current from the power source and supplies the controlled control current to respective coils.

This switching circuit may include:

a first half-bridge circuit having two semiconductor switching elements, in which the semiconductor switching elements are connected in series at a connecting node, both ends thereof are connected to the power source, and the neutral node is connected to the connecting node;

a second half-bridge circuit having two semiconductor switching elements, in which the semiconductor switching elements are connected in series at a connecting node, both ends thereof are connected to the power source, and the U-phase coil is connected to the connecting node;

a third half-bridge circuit having two semiconductor switching elements, in which the semiconductor switching elements are connected in series at a connecting node, both ends thereof are connected to the power source, and the V-phase coil is connected to the connecting node; and a fourth half-bridge circuit having two semiconductor switching elements, in which the semiconductor switching elements are connected in series at a connecting node, both ends thereof are connected to the power source, and the W-phase coil is connected to the connecting node.

Furthermore, the SR motor control apparatus includes a switching unit. This switching unit has at least two power modules on which the above-described four half-bridge circuits are mounted.

The switching unit of this SR motor control apparatus may include a first power module on which the first half-bridge circuit is mounted independently of other half-bridge circuits. The neutral node of the SR motor is connected to the first half-bridge circuit. Therefore, unlike other half-bridge circuits that operate intermittently, the first half-bridge circuit is almost always in the turning on and off operation when the SR motor is in operation. That is, the first half-bridge circuit has usage characteristics that it is used frequently. Thus, the first half-bridge circuit may be mounted to the power module independently of other half-bridge circuits. In this case, design of the power module can be facilitated taking into consideration of the usage characteristics of the first half-bridge circuit that it is almost always in the turning on and off operation, it is used frequency, and the amount of heat generation is large.

According to this SR motor control apparatus, each half-bridge circuit can be mounted on the power module taking into consideration of usage characteristics of the half-bridge circuit.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. An SR motor control apparatus, comprising:
a first half-bridge circuit having an element array including two semiconductor switching elements connected in series at a connecting node, both ends of the element array being connected to a power source, and a neutral node of an SR motor being connected to the connecting node;
a second half-bridge circuit having an element array including two semiconductor switching elements connected in series at a connecting node, both ends of the element array being connected to the power source, and a U-phase coil of the SR motor being connected to the connecting node;
a third half-bridge circuit having an element array including two semiconductor switching elements connected in series at a connecting node, both ends of the element array being connected to the power source, and a V-phase coil of the SR motor being connected to the connecting node;
a fourth half-bridge circuit having an element array including two semiconductor switching elements connected in series at a connecting node, both ends of the element array being connected to the power source, and a W-phase coil of the SR motor being connected to the connecting node; and
a switching unit including at least two power modules on which the first to fourth half-bridge circuits are mounted.

2. The SR motor control apparatus according to claim 1, wherein the switching unit includes a first power module that allows the first half-bridge circuit to be mounted thereon among the half-bridge circuits.

3. The SR motor control apparatus according to claim 2, wherein the switching unit includes a second power module on which the second to fourth half-bridge circuits are mounted.

4. The SR motor control apparatus according to claim 2, wherein the switching unit includes:
a second power module on which the second half-bridge circuit is mounted;
a third power module on which the third half-bridge circuit is mounted; and
a fourth power module on which the fourth half-bridge circuit is mounted.

5. The SR motor control apparatus according to claim 2, wherein a current path to the power source in the first power module is shorter than that in other power modules.

6. The SR motor control apparatus according to claim 2, further comprising:
a capacitor for compensating fluctuation in a voltage value of the power source,
wherein a current path to the capacitor in the first power module is shorter than that in other power modules.

7. The SR motor control apparatus according to claim 1, wherein the semiconductor switching element is an IGBT.

8. The SR motor control apparatus according to claim 1, wherein the semiconductor switching element is an FET.

* * * * *